US010995837B2

(12) United States Patent
Walter

(10) Patent No.: US 10,995,837 B2
(45) Date of Patent: May 4, 2021

(54) CVT DRIVE TRAIN

(71) Applicant: Schaeffler Technologies AG & Co. KG, Herzogenaurach (DE)

(72) Inventor: Bernhard Walter, Oberkirch-Haslach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/332,001

(22) PCT Filed: Nov. 14, 2017

(86) PCT No.: PCT/DE2017/100964
§ 371 (c)(1),
(2) Date: Mar. 11, 2019

(87) PCT Pub. No.: WO2018/091036
PCT Pub. Date: May 24, 2018

(65) Prior Publication Data
US 2019/0368588 A1    Dec. 5, 2019

(30) Foreign Application Priority Data
Nov. 21, 2016   (DE) .......................... 102016222936.2

(51) Int. Cl.
*F16H 37/08* (2006.01)
*F16H 61/662* (2006.01)
(Continued)

(52) U.S. Cl.
CPC ..... *F16H 37/0846* (2013.01); *F16H 61/6625* (2013.01); *F16H 61/66259* (2013.01);
(Continued)

(58) Field of Classification Search
CPC .......... F16H 37/0846; F16H 2037/026; F16H 2037/088; F16H 61/6625; F16H 61/66259; F16H 61/70
See application file for complete search history.

(56) References Cited

U.S. PATENT DOCUMENTS 5,846,152 A * 12/1998 Taniguchi ........... F16H 37/0846
475/210
6,269,895 B1 * 8/2001 Tanuguchi ............. B60K 6/365
180/65.25
(Continued)

FOREIGN PATENT DOCUMENTS

EP      0781940 A1    7/1997
EP      0908343 A2    4/1999
(Continued)

OTHER PUBLICATIONS

Ando Masahiko. Machine translation of JP2010234922. Oct. 21, 2010. Espacenet. (Year: 2010).*

*Primary Examiner* — Charles A Fox
*Assistant Examiner* — Lori Wu
(74) *Attorney, Agent, or Firm* — Kevin L. Parks

(57) ABSTRACT

A CVT drive train includes a gearbox input shaft, a secondary drive, a differential, and a continuously adjustable variator. The gearbox input shaft is arranged on a motor side. The secondary drive has a starting device and an electric motor, both arranged coaxially to the gearbox input shaft. The electric motor has a stator, and a rotor arranged radially inside of the stator. The differential has a differential output gear. The continuously adjustable variator has a drive-side disc set, and an output-side disc set coupled to the differential and arranged directly adjacent to the differential output gear in a plan view. The drive-side disc set has a drive-side adjustable disc, and a drive-side fixed disc facing away from the motor side. The output-side disc set has an
(Continued)

output-side fixed disc, and an output-side adjustable disc facing away from the motor side.

8 Claims, 3 Drawing Sheets

(51) Int. Cl.
*F16H 61/70* (2006.01)
*F16H 37/02* (2006.01)

(52) U.S. Cl.
CPC ........ *F16H 61/70* (2013.01); *F16H 2037/026* (2013.01); *F16H 2037/088* (2013.01)

(56) References Cited

U.S. PATENT DOCUMENTS

| | | | |
|---|---|---|---|
| 2011/0053731 A1* | 3/2011 | Greenwood | B62D 11/006 476/47 |
| 2013/0075183 A1 | 3/2013 | Kochidomari | |
| 2016/0312869 A1* | 10/2016 | Walter | F16H 37/0813 |

FOREIGN PATENT DOCUMENTS

| | | |
|---|---|---|
| JP | 2010234922 A | 10/2010 |
| JP | 2014015188 A | 1/2014 |
| WO | 2015/110108 A1 | 7/2015 |

* cited by examiner

CVT DRIVE TRAIN

CROSS-REFERENCE TO RELATED APPLICATIONS

This application is the United States National Phase of PCT Appln. No. PCT/DE2017/100964 filed Nov. 14, 2017, which claims priority to German Application No. DE102016222936.2 filed Nov. 21, 2016, the entire disclosures of which are incorporated by reference herein.

TECHNICAL FIELD

The disclosure concerns a CVT drive train having a continuously adjustable variator that includes a drive-side disc set and an output-side disc set which is coupled to a differential with a differential output gear

BACKGROUND

International publication WO 2015/110108 A1 discloses a CVT drive train with a continuously adjustable variator, with a gearbox input shaft arranged on a primary drive side, and a starting device and a secondary drive, in particular an electric motor forming a secondary drive, arranged coaxially to said gearbox input shaft. The structure and/or operation of the CVT drive train are simplified or improved by an additional clutch which serves for coupling the secondary drive to a direct transmission gear, and a second additional clutch which serves for coupling to variator input.

SUMMARY

A CVT drive train includes a continuously adjustable variator with a drive-side disc set and an output-side disc set coupled to a differential having a differential output gear. The drive-side disc set includes an adjustable disc and a fixed disc which faces away from a gearbox input shaft arranged on the motor side. A starting device and an electric motor constituting a secondary drive are arranged coaxially to the gearbox input shaft. The electric motor has a rotor arranged radially inside a stator. The output-side disc set includes a fixed disc and an adjustable disc facing away from the motor side, in that the differential output gear, considered in plan view, is arranged directly adjacent to the output-side disc set. The term "directly" means that no further component such as a bearing is arranged between the differential output gear and the output-side disc set, in particular the fixed disc on the output side.

During operation of the CVT drive train, the adjustable disc is displaceable in the axial direction relative to the fixed disc. The term "axial" here refers to a rotation axis of the drive-side disc set which coincides with the rotation axis of the rotor of the electric motor. "Axial" means in the direction of or parallel to the rotation axis. "Radial" means transversely to the rotation axis. A torque for driving the CVT drive train is preferably provided by an internal combustion engine. A drive shaft of the internal combustion engine may be connected rotationally fixedly to the gearbox input shaft via the starting device, which is for example configured as a multiplate clutch, in some cases with the interposition of a torsional vibration damper.

The starting device is arranged radially inside and axially overlapping with the electric motor. The internal combustion engine constitutes a primary drive in the CVT drive train configured as a hybrid drive train. The electric motor, also known as the electric machine, constitutes a secondary drive in the CVT drive train configured as a hybrid drive train. According to an example embodiment, the CVT drive train is designed without a mechanical reverse gear. In addition, the CVT drive train is also designed without a direct drive gear or direct gear. In this way, axial installation space can be saved. In addition, the production costs may be reduced.

The electric motor or electric machine may, in motor operating mode, conduct electrical energy as electrically generated torque into the drive train in order thus to be able to drive a motor vehicle purely electrically, for example. Also, in generator operating mode, the electric motor may divert a torque from the drive train and produce electrical energy, which can be stored in a motor vehicle battery, e.g., a traction battery, and be retrieved again for purely electric drive of the motor vehicle. The electric motor may have a stator with electromagnets which can cooperate with a rotor, e.g., permanent magnets, in order to exchange power. In principle, a high power of the electric motor is desirable in electrically powered motor vehicles. The high electrical power can be achieved if the rotor and stator have as large a diameter as possible and the greatest possible axial extent, since in this way, particularly many cooperating permanent magnets and/or electromagnets can be provided. The dimensions of the electric motor are however greatly limited by the installation space available in the motor vehicle.

The letters "CVT" in front of the words "drive train" stand for "continuously variable transmission". The two disc sets of the variator can be coupled together for torque transmission by a traction means such as a chain. The discs of the disc set are for example formed as conical discs. The spacing between the conical discs of the respective disc set or conical disc pair can be varied so as to vary the translation ratio continuously.

The differential is a differential gear mechanism having at least one output shaft which leads to a drive wheel of the motor vehicle in order to propel the motor vehicle over the ground. Reverse travel of the motor vehicle can be achieved using the electric motor which can rotate in different directions. The gearbox input shaft is coupled to a pump, using which a hydraulic pressure can be built up, in particular to operate the variator and/or to switch the starting device, in some cases also to switch a further clutch device. In order to transfer a hydraulic medium such as hydraulic oil, the gearbox input shaft, a variator drive shaft and a variator output shaft are equipped with at least one conveying channel, through which hydraulic medium, in particular hydraulic oil, can be conveyed to the respective hydraulic consumer.

An exemplary embodiment of the CVT drive train is characterized in that the differential output gear is arranged overlapping the drive-side adjustable disc in the axial direction. In this way, the installation space available can be utilized more efficiently.

A main bearing of the drive-side disc set may be arranged radially inside and axially overlapping the electric motor. The drive-side disc set is for example mounted on two main bearings, one of which is assigned to the drive-side fixed disc. The other main bearing, which is assigned to the drive-side adjustable disc, is arranged axially between a wall of the drive-side adjustable disc which delimits a compression chamber, and the starting device, radially inside the electric motor. The main bearing assigned to the drive-side adjustable disc serves for mounting a variator drive shaft in a housing, and may be arranged overlapping the stator of the electric machine in the axial direction.

An exemplary embodiment of the CVT drive train is characterized in that the rotor of the electric motor is supported via a rotor carrier on a variator drive shaft of the drive-side disc set. The rotor carrier may be configured in one piece or from multiple pieces. The rotor carrier serves radially outwardly for attachment of the rotor, e.g., for attachment and support of permanent magnets. Radially inwardly, the rotor carrier is supported on the gearbox input shaft.

A further exemplary embodiment of the CVT drive train is characterized in that the rotor carrier is fixedly connected to the gearbox input shaft which is connected to the variator drive shaft via a push-fit toothing and a centering seat and/or press fit. The centering seat and/or press fit is arranged inside and axially overlapping that of the adjustable disc of the drive-side disc set and the electric motor. The push-fit toothing serves for torque transmission. The centering seat and/or press fit serves for stable support of the rotor on or at the variator drive shaft.

A further exemplary embodiment of the CVT drive train is characterized in that an intermediate shaft bearing, for an intermediate shaft of a connecting gear between the variator output gear and the differential, includes a bearing plate fixedly arranged on the housing and having a bearing journal which is connected integrally to the bearing plate. The bearing plate with the bearing journal is made of a steel material. In this way, a stable mounting of the intermediate shaft can easily be created. For mounting, one end of the intermediate shaft is equipped with a bearing ring which is, for example, integrally connected to the intermediate shaft. Roller bodies are arranged between the bearing journal and the bearing ring of the intermediate shaft. The bearing plate is bolted, for example, by means of suitable fixing bolts, to a housing, for example, a variator housing.

An exemplary embodiment of the CVT drive train is characterized in that a planetary gear set for forming a reverse gear is arranged radially inside and axially overlapping the electric motor. In this way, the installation space available can be utilized efficiently. The planetary gear set for forming the reverse gear is arranged axially between the starting device and the main bearing assigned to the adjustable disc of the drive-side disc set. The planetary gear set includes, for example, a sun wheel, or sun gear, which is connected rotationally fixedly to the gearbox input shaft. A crown wheel, or ring gear, of the planetary gear set is connected to an inner plate carrier of a braking device configured as a multiplate clutch. Planet wheels, or planet gears, intermesh with the sun wheel and crown wheel in the known fashion. The planet wheels are arranged rotatably on a planet carrier, which in turn is connected to the rotor carrier of the rotor of the electric motor or electric machine. An outer plate carrier of the braking device configured as a multiplate clutch is arranged fixedly on the housing. A hydraulic actuating device for hydraulic actuation of the braking device configured as a multiplate clutch is arranged radially outside and axially overlapping with a wall, delimiting a compression chamber, of the adjustable disc of the drive-side disc set.

A further exemplary embodiment of the CVT drive train is characterized in that a device for detecting a circumferential position and/or a rotation speed is arranged radially inside the electric motor, between the starting device and a braking device for the planetary gear set for forming the reverse gear. Said device may be an electromagnetic measurement transducer for converting the angular position of the rotor into an electrical value. Such electromagnetic measurement transducers are also known as resolvers. The device includes two function parts, one of which, in particular an inner function part, is connected rotationally fixedly to the rotor carrier. A second function part, in particular an outer function part, is connected rotationally fixedly, for example, to a housing, in particular the motor housing. The first function part, in particular the inner function part, rotates together with the rotor carrier relative to the second function part, in particular the outer function part, which for example comprises windings.

A further exemplary embodiment of the CVT drive train is characterized in that an additional clutch is arranged radially inside and axially overlapping the electric motor. The additional clutch may be arranged axially between the starting device and the main bearing assigned to the adjustable disc of the drive-side disc set. The additional clutch serves to separate a force transfer connection to a driven wheel, in order for example to be able to charge a battery via the electric machine when the vehicle is stationary and the internal combustion engine is running. The additional clutch is, for example, configured as a wedge coupling. In drive terms, the additional clutch is arranged between the gearbox input shaft and the variator drive shaft.

The disclosure furthermore concerns a transmission kit for a CVT drive train as described above, with a housing contour for at least two of the following transmission variants: with a planetary gear set for forming a reverse gear; without a planetary gear set for forming a reverse gear; with a broad electric motor; with a narrow electric motor; with an additional clutch; without an additional clutch.

BRIEF DESCRIPTION OF THE DRAWINGS

Further advantages, features and details of the invention arise from the description below in which various exemplary embodiments are described in detail with reference to the drawing. The drawings show.

DETAILED DESCRIPTION

Figure 1:
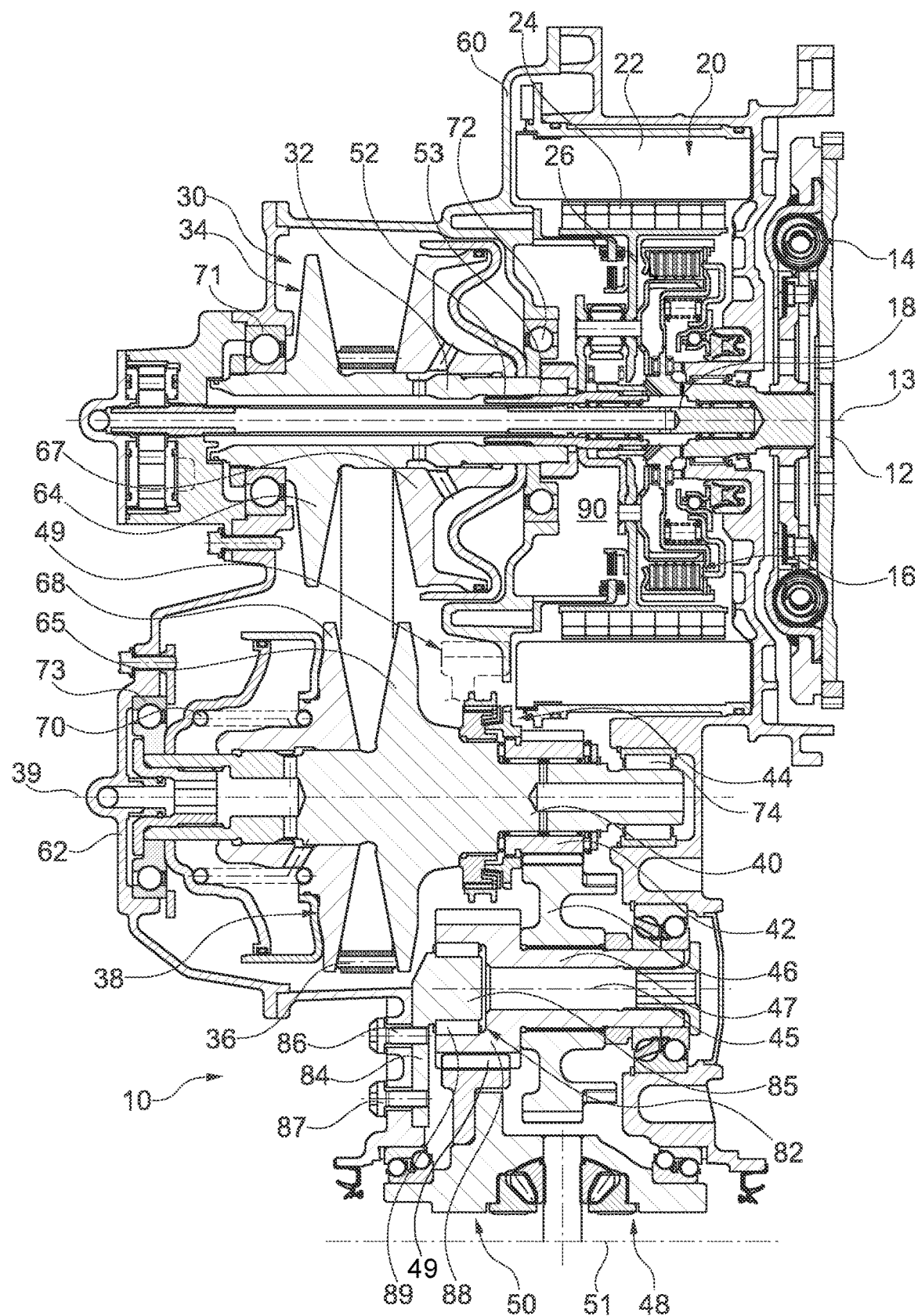
FIG. 1 is a partially opened, longitudinal sectional depiction through a drive-side and an output-side disc set of a CVT drive train.

FIG. 1 shows, in a partially angled longitudinal section, a CVT drive train 10 of a motor vehicle with a drive shaft 12. The drive shaft 12 is rotatable about a rotation axis 13. The drive shaft 12 is a hub which can be coupled to a crankshaft of an internal combustion engine via a torsional vibration damper 14, here configured as a dual mass flywheel. The internal combustion engine constitutes a primary drive in the CVT drive train 10.

The drive shaft 12 may be coupled to a gearbox input shaft 18 via a starting device 16 configured as a multiplate clutch. The CVT drive train 10 has, as a secondary drive, an electric motor 20 which is also known as an electric machine 20. The electric motor 20 comprises a stator 22 having an electromagnet, and a rotor 24 cooperating with the stator 22 and equipped with permanent magnets.

A rotor carrier 26 carries the permanent magnets of the rotor 24 and, in the exemplary embodiment shown, is formed from multiple pieces. Radially inwardly, the rotor carrier 26 is fixedly connected to the gearbox input shaft 18.

The rotation speed and torque of the gearbox input shaft 18 may be converted in a variator 30. A variator drive shaft 32 is to this end connected rotationally fixedly to the gearbox input shaft 18. The variator drive shaft 32 drives a drive-side disc set 34 which is configured as a conical drive disc pair.

The drive-side disc set 34 is coupled via traction means 36 (e.g., a CVT chain) to an output-side disc set 38 which is configured as a conical output disc pair. Depending on the position of the conical drive disc pair 34 and the conical output disc pair 38, the translation ratio of the variator 30 can be varied continuously. The conical output disc pair 38 drives a variator output shaft 40 which may have a modified rotation speed and modified torque in comparison with the gearbox input shaft 18.

A variator output gear 42 is mounted on the variator output shaft 40. The variator output gear 42 can be coupled rotationally fixedly to the variator output shaft 40 by means of a variator clutch 44. The variator output gear 42 is coupled via a connecting gear 46 to a differential gear mechanism 48, known in brief as a differential 48. The differential gear mechanism 48 comprises output shafts 50 leading to drive wheels (not shown).

The drive-side disc set 34 and the variator drive shaft 32 are arranged coaxially to the drive shaft 12 with the rotation axis 13. The output-side disc set 38 and the variator output gear 42 are rotatable about a rotation axis 39 which is arranged parallel to the rotation axis 13. The connecting gear 46 with an intermediate shaft 47 is rotatable about a rotation axis 45 which is arranged parallel to the rotation axes 13 and 39. The output shaft 50 of the differential 48, and the differential output gear 49, are rotatable about a rotation axis 51 which is arranged parallel to the rotation axes 13, 39 and 45.

Figure 2:
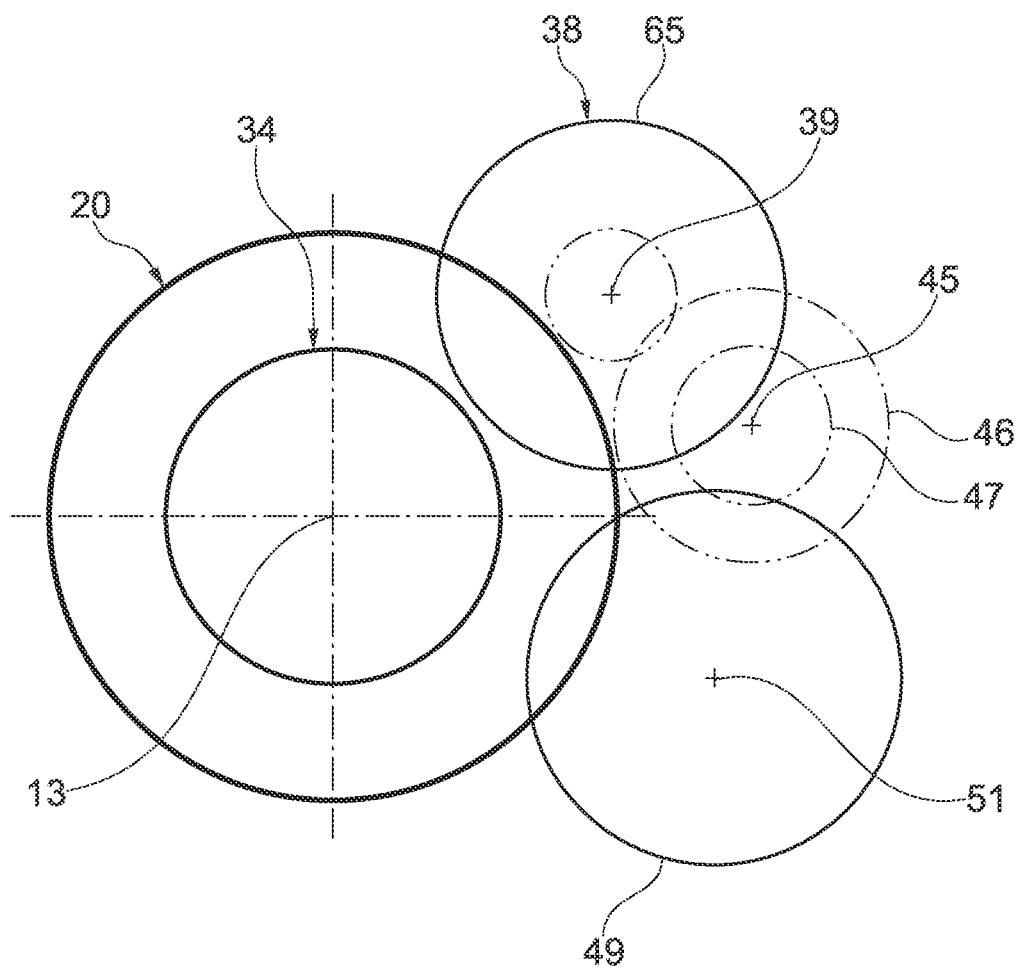
FIG. 2 is a cross-sectional depiction of the CVT drive train in FIG. 1, to illustrate the actual positions of rotation axes.

FIG. 1 shows a portion of differential output gear 49 in dotted lines depicting differential output gear 49 directly adjacent to output side fixed disc 65 as would be shown in another cross-sectional views not visible in the open longitudinal sectional depiction of FIG. 1. FIG. 2 shows the actual axial positions of the rotation axes 13, 39, 45 and 51 as they are really arranged. A comparison of FIGS. 1 and 2 shows that no further component is arranged between the relatively large differential output gear 49 and the output-side fixed disc 65 of the output-side disc set 38.

FIG. 1 shows that the end of the gearbox input shaft 18 facing away from the drive shaft 12 is connected rotationally fixedly to the variator drive shaft 32 by means of a push-fit connection configured as a push-fit toothing 52. The push-fit connection comprises, in addition to the push-fit toothing 52, a centering seat and/or press fit 53 between the gearbox input shaft 18 and the variator drive shaft 32.

The electric motor 20 is accommodated in a motor housing 60. The variator is accommodated in a variator housing 62. The variator housing 62 and the motor housing 60 are assembled into a common housing for the drive train 10.

The drive-side disc pair 34 comprises a fixed disc 64 and an adjustable disc 67. The output-side disc pair 38 comprises a fixed disc 65 and the adjustable disc 68. A return spring 70 is assigned to the adjustable disc 68.

The drive-side disc set 34 is mounted via a drive bearing 71 in the variator housing 62. By means of a drive bearing 72, also known as a main bearing, the primary-side disc set 34 is mounted in the motor housing 60.

The output-side disc set 38 is mounted in the variator housing 62 via an output bearing 73, also known as a main bearing. The motor-side shaft end of the variator output shaft 40 is mounted in the motor housing 60 via an output bearing 74.

The intermediate shaft 47 is mounted in the motor housing 60 by means of an intermediate shaft bearing 82. The intermediate shaft bearing 82 comprises a bearing plate 84 from which a bearing journal 85 protrudes. The bearing plate 84 and the bearing journal 85 are formed integrally from a steel material. The bearing plate 84 is attached to the motor housing 60 via bolts 86, 87. The intermediate shaft 47, at its left end in FIG. 1, has a ring body 88. The ring body 88 is integrally connected to the intermediate shaft 47 and surrounds the bearing journal 85 with the interposition of roller bodies 89.

According to a further exemplary embodiment (not shown), an additional clutch may be arranged in a free space 90 radially inside the electric machine 20, to replace the variator output clutch 44. The additional clutch, like the variator output clutch 44, serves to separate a force transfer connection to a driven wheel, in order to charge a vehicle battery via the electric motor 20 using the internal combustion engine when the vehicle is stationary.

The rotor 24 of the electric motor 20 rests via the rotor carrier 26 directly on the variator drive shaft 32 without a further intermediate mounting by means of the push-fit connection described above. The associated bearing forces are transmitted from the rotor carrier 26 to the drive bearing 72—also known as a main bearing—by the centering seat and/or press fit 53 of the gearbox input shaft 18.

Figure 3:
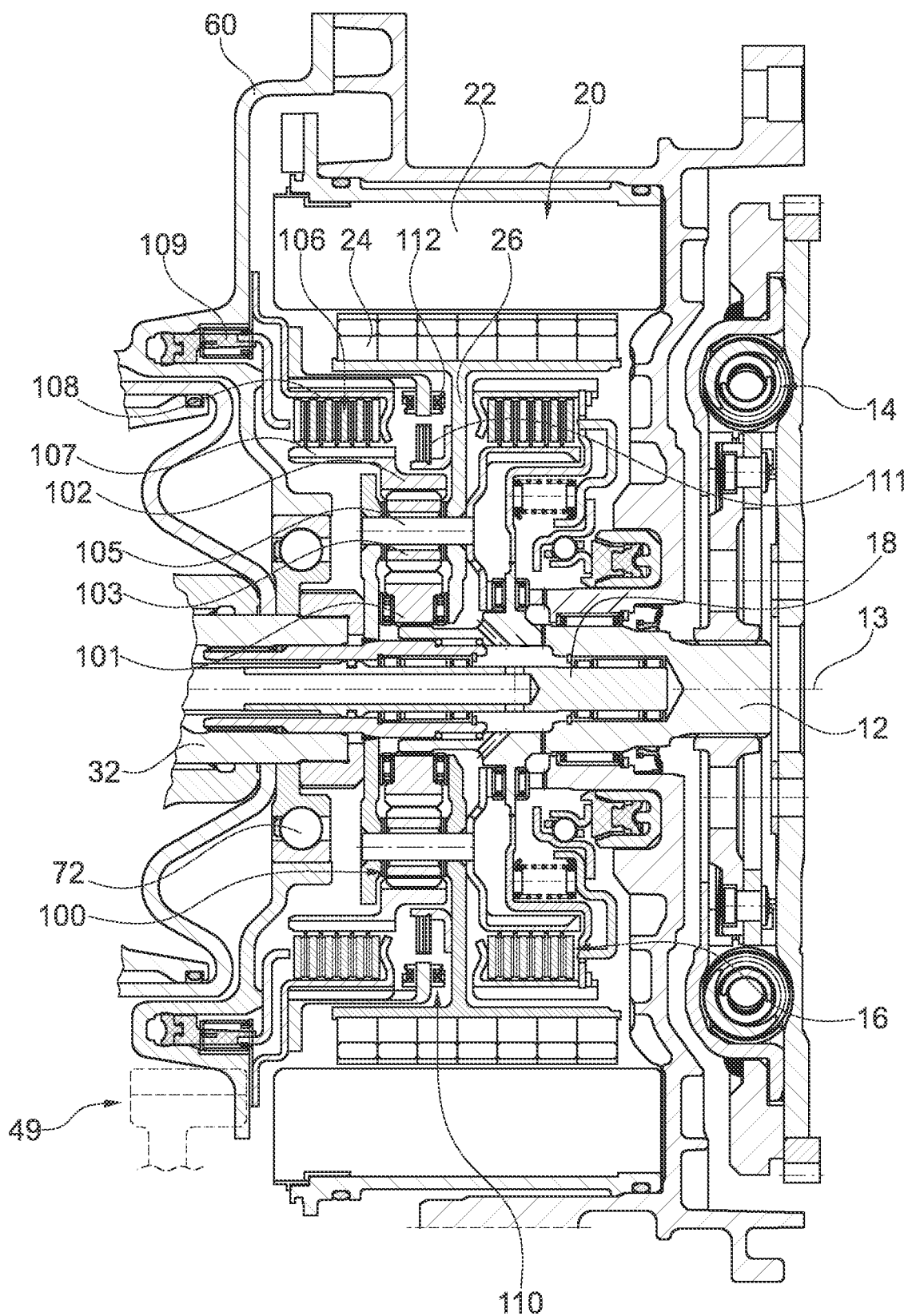
FIG. 3 is an enlarged extract from FIG. 1 with an additional planetary gear set for forming a mechanical reverse gear.

FIG. 3 shows in enlargement an extract from FIG. 1 according to a further exemplary embodiment. In the exemplary embodiment shown in FIG. 3, a planetary gear set 100 is arranged in the free space (90 in FIG. 1) and serves to create a mechanical reverse gear. The planetary gear set 100 comprises a sun gear 101 which is connected rotationally fixedly to the drive shaft 12. A ring gear 102 is connected rotationally fixedly to an inner plate carrier 107 of a braking device 106 configured as a multiplate clutch. Planet gears 103, which intermesh with both the sun gear 101 and the ring gear 102, are arranged between the sun gear 101 and the ring gear 102. The planet gears 103 are arranged rotatably on a planet carrier 105. The planet carrier 105 is connected rotationally fixedly to the rotor carrier 26. Radially inwardly, the planet carrier 105 is fixedly connected to the gearbox input shaft 18.

The braking device 106, configured as a multiplate clutch, comprises—in addition to the inner plate carrier 107—an outer plate carrier 108 which is connected rotationally fixedly to the motor housing 60. A hydraulic actuation device 109 for actuating the braking device 106, configured as a multiplate clutch, is arranged axially adjacent to the rotor 24 of the electric motor 20 and radially outside a wall, which delimits a compression chamber, of the drive-side adjustable disc.

A device 110, known as a resolver, for detecting a circumferential position and/or a rotation speed is arranged radially inside the electric motor 20, between the starting device 16 and the braking device 106 for the planetary gear set 100. The resolver 110 comprises a first function part 111 and a second function part 112. The first function part 111 is arranged radially inside the second function part 112 and is also known as an inner function part 111. Similarly, the second function part 112 is also known as an outer function part 112. The radially inner function part 111 is connected rotationally fixedly to the rotor carrier 26. The radially outer function part 112 comprises windings for example, and is connected rotationally fixedly to the motor housing 60. In the radial direction, the device 110 is arranged between the planetary gear set 100 and the motor 24 of the electric machine 20.

REFERENCE SYMBOLS

10 Drive train
12 Drive shaft
13 Rotation axis
14 Torsional vibration damper
16 Starting device
18 Gearbox input shaft
20 Electric motor
22 Stator
24 Rotor
26 Rotor carrier
30 Variator
32 Variator drive shaft
34 Drive disc pair
36 Traction means
38 Output disc pair
39 Rotation axis
40 Variator output shaft
42 Variator output gear
44 Variator clutch
45 Rotation axis
46 Connecting gear
47 Intermediate shaft
48 Differential
49 Differential output gear
50 Output shaft
51 Rotation axis
52 Push-fit toothing
53 Centering seat
60 Motor housing
62 Variator housing
64 Fixed disc
65 Fixed disc
67 Adjustable disc
68 Adjustable disc
70 Return spring
71 Drive bearing
72 Drive bearing
73 Output bearing
74 Output bearing
82 Intermediate shaft bearing
84 Bearing plate
85 Bearing journal
86 Bolt
87 Bolt
88 Ring body
89 Roller bearing
90 Free space
100 Planetary gear set
101 Sun gear
102 Ring gear
103 Planet gears
105 Planet carrier
106 Braking device
107 Inner plate carrier
108 Outer plate carrier
109 Hydraulic actuating device
110 Resolver
111 First function part
112 Second function part

The invention claimed is:

1. A continuously variable transmission (CVT) drive train comprising:
a gearbox input shaft arranged on a motor side;
a secondary drive comprising:
a starting device arranged coaxially to the gearbox input shaft; and,
an electric motor arranged coaxially to the gearbox input shaft and comprising:
a stator; and,
a rotor arranged radially inside of the stator;
a differential comprising a differential output gear; and,
a continuously adjustable variator comprising:
a drive-side disc set comprising:
a drive-side adjustable disc; and,
a drive-side fixed disc located further away from the motor side than the drive-side adjustable disc; and,
an output-side disc set, rotatable about a rotation axis, coupled to the differential and arranged directly adjacent to the differential output gear such that a portion of the drive-side disc set at least partially overlaps the differential output gear when viewed in a direction of the rotation axis, the output-side disc set comprising:
an output-side fixed disc; and,
an output-side adjustable disc located further away from the motor side than the drive-side adjustable disc.

2. The CVT drive train of claim 1, wherein the drive-side disc set comprises a main bearing arranged radially inside of and axially overlapping the electric motor.

3. The CVT drive train of claim 1 further comprising a rotor carrier, wherein:
the drive-side disc set comprises a variator drive shaft; and,
the rotor is supported on the variator drive shaft by the rotor carrier.

4. The CVT drive train of claim 3 wherein:
the rotor carrier is fixedly connected to the gearbox input shaft; and,
the gearbox input shaft is connected to the variator drive shaft by:
a push-fit toothing; and,
a centering seat or a press fit.

5. The CVT drive train of claim 1 further comprising:
a housing;
a variator output gear;
an intermediate shaft;
a connecting gear on the intermediate shaft between the variator output gear and the differential; and,
an intermediate shaft bearing for the intermediate shaft comprising:
a bearing plate fixed to the housing; and,
a bearing journal integrally connected to the bearing plate.

6. The CVT drive train of claim 1, further comprising a planetary gear set for forming a reverse gear arranged radially inside of and axially overlapping the electric motor.

7. The CVT drive train of claim 6 further comprising:
a braking device for the planetary gear set; and,
a device for detecting a circumferential position or a rotation speed arranged radially inside of the electric motor between the starting device and the braking device.

8. The CVT drive train of claim 1 further comprising a clutch arranged radially inside of and axially overlapping the electric motor.

* * * * *